US012690117B2

(12) United States Patent　　　　(10) Patent No.:　US 12,690,117 B2 van Ooij et al.　　　　　　　　　　　(45) Date of Patent:　　　　Jul. 21, 2026

(54) PLASMA ACTIVATED FLUID PROCESSING SYSTEM

(71) Applicant: VitalFluid B.V., Eindhoven (NL)

(72) Inventors: Pieter Polo van Ooij, Eindhoven (NL); Frank Jozef Cornelis Marie Beckers, Venlo (NL)

(73) Assignee: VitalFluid B.V., Eindhoven (NL)

( * ) Notice: Subject to any disclaimer, the term of this patent is extended or adjusted under 35 U.S.C. 154(b) by 965 days.

(21) Appl. No.: 17/601,476

(22) PCT Filed: Apr. 10, 2020

(86) PCT No.: PCT/NL2020/050247

§ 371 (c)(1),
(2) Date: Oct. 5, 2021

(87) PCT Pub. No.: WO2020/209723

PCT Pub. Date: Oct. 15, 2020

(65) Prior Publication Data

US 2022/0159821 A1　　May 19, 2022

(30) Foreign Application Priority Data

Apr. 12, 2019　(NL) ..................................... 2022938

(51) Int. Cl.
H05H 1/48　　　　(2006.01)
C02F 1/46　　　　(2023.01)
(Continued)

(52) U.S. Cl.
CPC ......... H05H 1/2406 (2013.01); C02F 1/4608 (2013.01); H05H 1/466 (2021.05)

(58) Field of Classification Search
CPC ........ H05H 1/2406; H05H 1/466; H05H 1/48; C02F 1/4608; C02F 1/722; C02F 1/4618;
(Continued)

(56) References Cited

U.S. PATENT DOCUMENTS

| | | | |
|---|---|---|---|
| 4,887,005 | A | 12/1989 | Rough et al. |
| 5,977,715 | A | 11/1999 | Li et al. |

(Continued)

FOREIGN PATENT DOCUMENTS

| | | |
|---|---|---|
| CN | 101622442 A | 1/2010 |
| CN | 202107566 U | 1/2012 |

(Continued)

*Primary Examiner* — Xiuyu Tai

(74) *Attorney, Agent, or Firm* — Ipsilon USA—NLO

(57)　　　　　　　ABSTRACT

The disclosure relates to a plasma activated fluid processing; including
　an alternating current, AC, source,
　one reaction chamber, wherein the one reaction chamber has a plurality of reaction electrodes and a corresponding ground electrode, each reaction electrode and corresponding ground electrode separated by a gap;
　or
　a plurality of reaction chambers, wherein each reaction chamber has at least one reaction electrode and a corresponding ground electrode, the reaction electrode and corresponding ground electrode separated by a gap;
wherein the AC source is electrically connected on one side to each ground electrode in parallel and on another side to each reaction electrode in parallel, wherein each reaction electrode is connected to ground via a capacitor, and wherein an inductor is provided between each reaction electrode and the AC source.

9 Claims, 3 Drawing Sheets

(51) Int. Cl.
    *H05H 1/24*         (2006.01)
    *H05H 1/46*         (2006.01)

(58) Field of Classification Search
    CPC ............... C02F 1/74; C02F 2201/4611; C02F
               2303/04; C02F 2201/46155; C02F
               2301/026; C02F 2201/46175; B01J
               19/088; B01J 2219/0877; B01J
               2219/0896; B01J 2219/0898; B01J
             2219/0809; C01B 15/027; C05C 11/00;
           F02P 3/01; F02P 3/02; F02P 7/02; F02P
           15/10; F02P 23/04; F02P 9/007; F02P
                               3/0442
    See application file for complete search history.

(56)                     References Cited

U.S. PATENT DOCUMENTS

| | | | |
|---|---|---|---|
| 2007/0176562 A1 | 8/2007 | Takikawa et al. | |
| 2017/0094769 A1* | 3/2017 | Eckert | A61B 18/042 |
| 2018/0306161 A1* | 10/2018 | Tanaya | F02P 3/01 |
| 2018/0317508 A1* | 11/2018 | Yagyu | A23B 2/50 |
| 2018/0327283 A1* | 11/2018 | Pemen | B01J 19/088 |

FOREIGN PATENT DOCUMENTS

| | | |
|---|---|---|
| CN | 103204570 A | 7/2013 |
| CN | 105198034 A | 12/2015 |
| CN | 108163925 A | 6/2018 |
| DE | 102006019664 A1 | 10/2007 |
| JP | 2005347205 A | 12/2005 |
| WO | 0137619 A1 | 5/2001 |
| WO | 2016096751 A1 | 6/2016 |

* cited by examiner

PLASMA ACTIVATED FLUID PROCESSING SYSTEM

FIELD OF THE INVENTION

The invention relates to a system and method for processing a fluid using a plasma. Examples of such plasma activated fluid processing include plasma activated water synthesis and processing gas comprising nitrogen and oxygen, such as air, for nitrogen fixation.

BACKGROUND OF THE INVENTION

Water can be "activated" by applying plasma in contact with the water, for instance by creating plasma inside (bubbles in) the water, or along a water surface. Plasma activated water (PAW) typically contains hydrogen peroxide, nitrates, nitrites, where peroxynitrite is formed due to a reaction with nitrite and hydrogen peroxide in an acidic environment, and is present in PAW for period of approximately 15 minutes after activation. Further, PAW typically has a pH ranging from 0 to 7. The components of PAW and the low pH have proven synergistic antimicrobial effects against bacteria, biofilms, yeasts and other microorganisms. PAW can be used as a natural fertilizer, it enhances seed germination and stimulates plant growth.

The production of nitrate as a result of the activation process is shown to be very energy efficient and can be used as an energy efficient alternative for the production of nitrogen components in fertilizers, currently produced by the high energy consuming Haber-Bosch process. The activation process has also shown to be efficient for the production of hydrogen peroxide.

Nitrogen fixation (NF) is a process by which nitrogen molecules ($N_2$) in air or nitrogen gas, which are relatively nonreactive molecules, are converted into nitrogenous compounds. A plasma in air can create reactive nitrogen and oxygen species which form nitric and nitrous acid in an aqueous environment.

The Birkeland-Eyde electric arc nitrogen fixation process was developed in 1903. The process consists of multiple steps. First an arc plasma is applied to convert nitrogen/oxygen into nitric oxide (NO) which is subsequently further oxidized into nitric dioxide ($NO_2$) by cooling the hot gasses and mixing them with atmospheric oxygen, finally $NO_2$ is converted into nitric acid ($HNO_3$) by absorption in water.

In the context of this description, the term "nitrogen fixation" shall refer to the formation of any nitrogen compound except $N_2$.

Plasma activated fluid processing can be achieved with a thermal or non-thermal plasma, which can be generated by connecting an alternating current (AC) or direct current (DC) power source to a circuit comprising a reaction electrode (sometimes referred to as a high-voltage (HV) electrode) and a ground electrode, between which the plasma will be created. The electrodes are located inside a reaction chamber which typically has inlets and outlets for fluid to be processed.

In the case of PAW synthesis, there will be inlets and outlets for water and air, in the case of NF, inlets and outlets for gas can be sufficient.

Published application WO 01/37619 A1 discloses an arc furnace. In order to re-ignite efficiently, a second energy supply is provided.

In DE 10 2006 019664 A1 a cold plasma device for plasma processing of surfaces is disclosed. All disclosed embodiments include only a single reaction electrode.

WO 2016/096751 A1 discloses a thermal and non-thermal plasma activated water reactor system.

The U.S. Pat. No. 5,977,715 discloses A handheld atmospheric pressure glow discharge plasma source. The embodiments include only a single reaction electrode.

A problem with current plasma activated fluid processing devices for PAW and/or NF is to upscale the device to using multiple reaction electrodes connected in parallel to the same power source. When a plasma ignites in the gap between a reaction electrode and a ground electrode, the current will run exclusively through that plasma due to the low electrical resistance of the plasma, making it impossible to ignite a plasma at the other reaction electrode(s).

An obvious solution is to use multiple power sources, one for each electrode. However, such a solution is more expensive than to use a single, larger, power source. The present invention strives to provide an alternative solution to the problem.

SUMMARY OF THE INVENTION

According to a first aspect, the invention provides a plasma activated fluid processing system, comprising:
- an alternating current, AC, source (10),
- one reaction chamber (14), wherein the one reaction chamber comprises a plurality of reaction electrodes (11) and a corresponding ground electrode (12), each reaction electrode and corresponding ground electrode separated by a gap;

or
- a plurality of reaction chambers (14), wherein each reaction chamber comprises at least one reaction electrode (11) and a corresponding ground electrode, the reaction electrode and corresponding ground electrode separated by a gap;
- wherein the AC source is electrically connected on one side to each ground electrode in parallel and on another side to each reaction electrode in parallel, wherein each reaction electrode is connected to ground (13) via a capacitor (21), and wherein an inductor (20) is provided between each reaction electrode and the AC source. Advantageously, the system is thus able to use a single AC source to power all reaction electrodes. In reaction chambers with more than one reaction electrode, the ground electrode can be a common ground electrode to a plurality of reaction electrodes. The corresponding ground electrode can be a common ground electrode to each reaction electrode in the chamber. Alternatively each reaction electrode can have its own corresponding reaction electrode The inductors and capacitors form an LC circuit for each electrode. The inductor can be a coil or other electrical component. The LC circuit will dampen the discharge current to prevent a low load impedance to the source when a plasma ignites. As a result, the other electrodes can ignite as well, overcoming the start-up problems of multi-electrode configurations.

In an embodiment according the invention, the frequency of the AC source is near the resonance frequency of the inductor-capacitor circuit. With "is near" is meant that the match is sufficient for a good coupling between the AC power source and LC circuit. Near resonance, the LC circuit can be excited so the voltage on the reaction electrode can be amplified up to the inception voltage of the plasma.

In an embodiment according the invention, the system comprises a plurality of inductors, each inductor connected to a respective reaction electrode, wherein the inductors are arranged in a symmetrical fashion, preferably a point-symmetrical fashion. A configuration with symmetric stray capacitances ensures that resonance frequencies are the same for all electrodes' circuits. It can also advantageously reduce the need for shielding between the inductors.

Using (point) symmetric inductors is a good way to promote symmetric stray capacitances, since the stray capacitance of the inductors is typically a major factor in the total capacitance. A further improvement would include a symmetric arrangement of other sources of (stray) capacitance, such as the electrodes.

In an embodiment according the invention, the system comprises a voltage measurement unit configured to determine a voltage gain of the fluid processing system, more specifically a voltage gain of a plasma generation part of the fluid processing system, and continually adjust the AC source frequency to maximize the voltage gain. This allows the system to track the resonance frequency, even when it shifts due to changing impedance due to igniting plasmas. In an embodiment, a single capacitive voltage sensor is placed in the centre of or encircled around the concentric coil structure or in the centre of or encircled around the (symmetrically arranged) electrodes so that the average gain of the complete system can be monitored. By maximizing the gain, the output power coupled into the system can be maximized.

In a further embodiment, a matching circuit is provided between the AC source and the parallel LC circuits. The matching circuit is configured to match the impedance of the source to the impedance of the parallel connected LC circuits for optimal power transfer.

In an embodiment according the invention, the capacitor is formed by the intrinsic capacitance of the system. The intrinsic capacitance can include the stray capacitance of the reaction electrode and/or a stray/self-capacitance of the inductor.

In an embodiment according the invention, the AC source is provided with a controller for periodic control of the voltage and/or frequency and/or waveform shape of the AC source output. The controller can be used to steer the plasma e.g. between thermal and non-thermal operation modes.

In an embodiment according the invention, the ground electrode is provided with a water interface and/or a dielectric barrier. In processing steps involving a liquid and gas (e.g. water and air), the liquid can effectively form a dielectric barrier. In case of gas processing, a dielectric barrier may be added on the ground electrode. A dielectric barrier can act as an inert surface (e.g. glass, ceramic) while it is capable to transfer the discharge current.

In an embodiment according the invention, the system comprises a plurality of reaction chambers, each reaction chamber having at least one reaction electrode and ground electrode connected in parallel to the AC source.

In an embodiment according the invention, each reaction chamber is provided with a plurality of reaction electrodes connected in parallel to the AC source.

In an embodiment according the invention, the plasma activated fluid processing system further comprises a gas inlet and/or outlet, a fluid inlet and a fluid outlet. The fluid inlet and fluid and gas outlet may be connected to a reservoir.

In an embodiment according the invention, the AC operating frequency is between 10 kHz and 50 MHz, preferably between 20 kHz and 15 MHz.

BRIEF DESCRIPTION OF THE FIGURES

Embodiments of the present invention will be described hereinafter, by way of example only, with reference to the accompanying drawings which are schematic in nature and therefore not necessarily drawn to scale. Furthermore, like reference signs in the drawings relate to like elements.

DETAILED DESCRIPTION

Figure 1A:
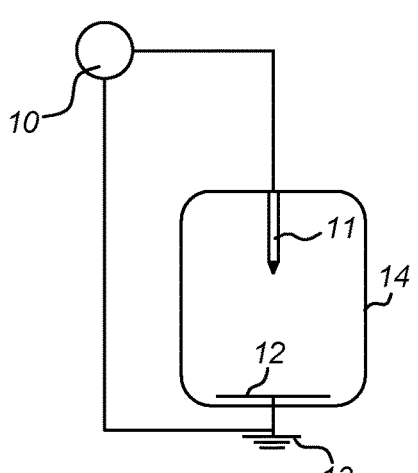
FIG. 1a-e schematically shows plasma activated fluid processing systems in various configurations according to embodiments of the invention.

FIG. 1a-e schematically shows plasma activated fluid processing systems in various configurations according embodiments of the invention. Details of the electrical components are mostly omitted, see FIG. 2 for those details. FIG. 1a depicts a basic example with just one reaction electrode 11 in one reaction chamber 14, wherein an alternating current power source 10, e.g. a high-voltage power source and/or an RF power source, provides electrical power to a single reaction electrode (also sometimes indicated as a high-voltage electrode) 11 inside reaction chamber 14. The reaction chamber 14 further includes a ground electrode 12, which is electrically connected to ground 13 and to the power source 10. It is understood that other configurations are also possible, for example instead of a pointed reaction electrode 11 and a surface ground electrode 12, two pointed electrodes can be used. Not only pointed electrodes can be used, also disc electrodes and other types of electrodes are available to the skilled person.

In operation, the reaction chamber will be filled with one or more fluids. In the case of PAW synthesis, this can be a mixture of water (located in the lower part of the reaction chamber, immersing the ground electrode 12) and air (located in the upper part of the reaction chamber). In the case of nitrogen fixation, the fluids may comprise air or pure nitrogen and other fluids comprising molecules used in the nitrogen fixation process (e.g. water, water vapour, oxygen, atmospheric air, etc).

When sufficient power and voltage is supplied to the electrode 11 by the power source 10, a thermal or non-thermal plasma can be created between the electrode 11 and ground electrode 12. With the plasma present, there is effectively a closed circuit involving the power source 10, the reaction electrode 11, the plasma and the ground electrode 12.

With the plasma present, the PAW synthesis and/or the nitrogen fixation occurs. PAW production methods can employ non-thermal (or cold) plasma or thermal plasma. PAW is synthesized by generating a plasma in air or a nitrogen/oxygen mixture in, near or in contact with a fluid (e.g. plasma in bubbles, a discharge in presence of a fluid/vapour, a discharge which contacts the fluid or a spray/aerosols which have intense contact with the plasma and or gas). The plasma essentially produces reactive oxygen and reactive nitrogen species (ROS, RNS) in the gas phase, which result in the formation of the products in the water.

Figure 1B:
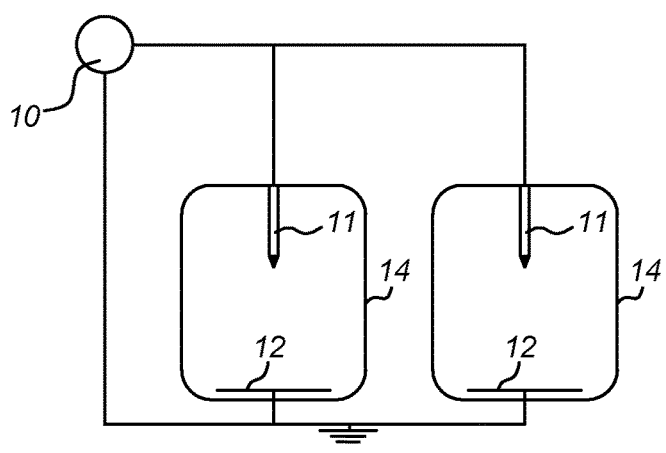

FIG. 1b shows a variant wherein a single power source 10 provides power to two reaction electrode 11/ground electrode 12 pairs, each pair in a separate reaction chamber 14. As was mentioned in the introduction, when no special measures are taken the system of FIG. 1b is difficult to start. Generally, one plasma will ignite first, for example the plasma in the left chamber 14. With the plasma present, the circuit through the left chamber will be effectively closed, and the voltage on the reaction electrodes drops below the inception voltage of the plasma, so that there is not enough electric field to ignite the plasma at other electrodes. The present invention overcomes this problem by adding a suitable inductor and capacitor (not shown in FIGS. 1a-e) between the power source and each electrode 11. More details are provided in reference to FIG. 2.

Figure 1C:
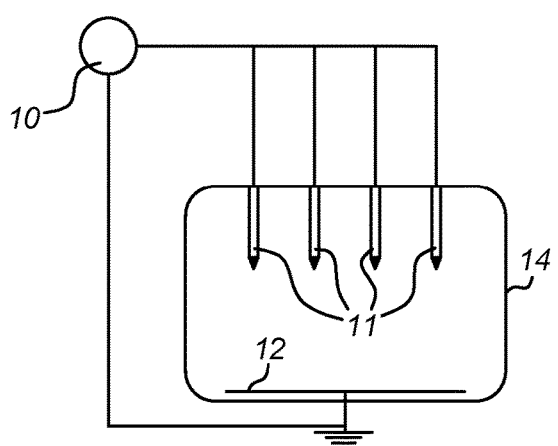

FIG. 1c shows a single reaction chamber 14 with four reaction electrodes 11 sharing one or more ground electrodes 12. Without the inductors and capacitors as described in reference to FIG. 2, this system would have similar start-up problems as described in reference to the system of FIG. 1b: when a plasma ignites at one electrode, it will be difficult to start a plasma at the other three.

Figure 1D:
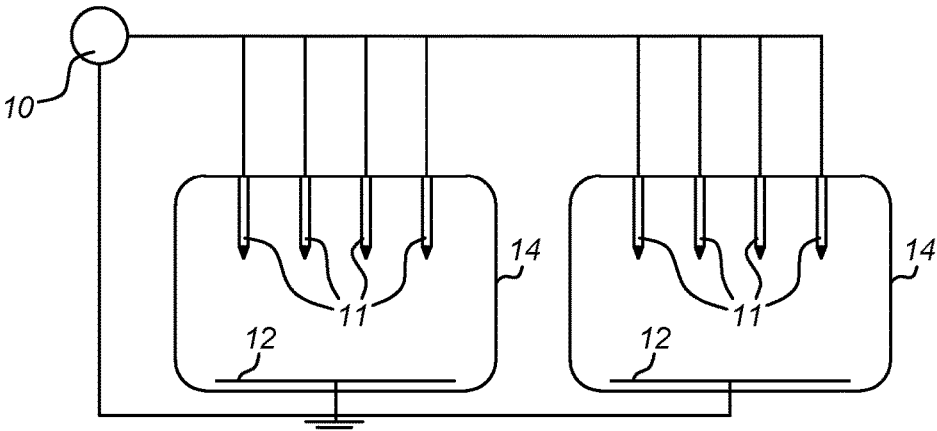

FIG. 1d shows a combination of FIGS. 1b and 1c, with two reaction chambers with four electrodes each. Again, without the inductors of FIG. 2 there would be start-up problems with this configuration. It will be clear to the skilled person that in general, provided the plasma source is powerful enough, any number of reaction chambers 14 with any number of electrodes 11 can be used. E.g. a power source 10 can be connected to m (m≥1) reaction chambers, with $n_1$, $n_2$, $n_3$, . . . $n_m$ electrodes, where $n_x$ indicates the number of electrodes in reaction chamber x (x≤m), and the total number of electrodes $n=n_1+n_2+n_3+$ . . . $+n_m$. The described start-up problems can occur if n>1.

Figure 1E:
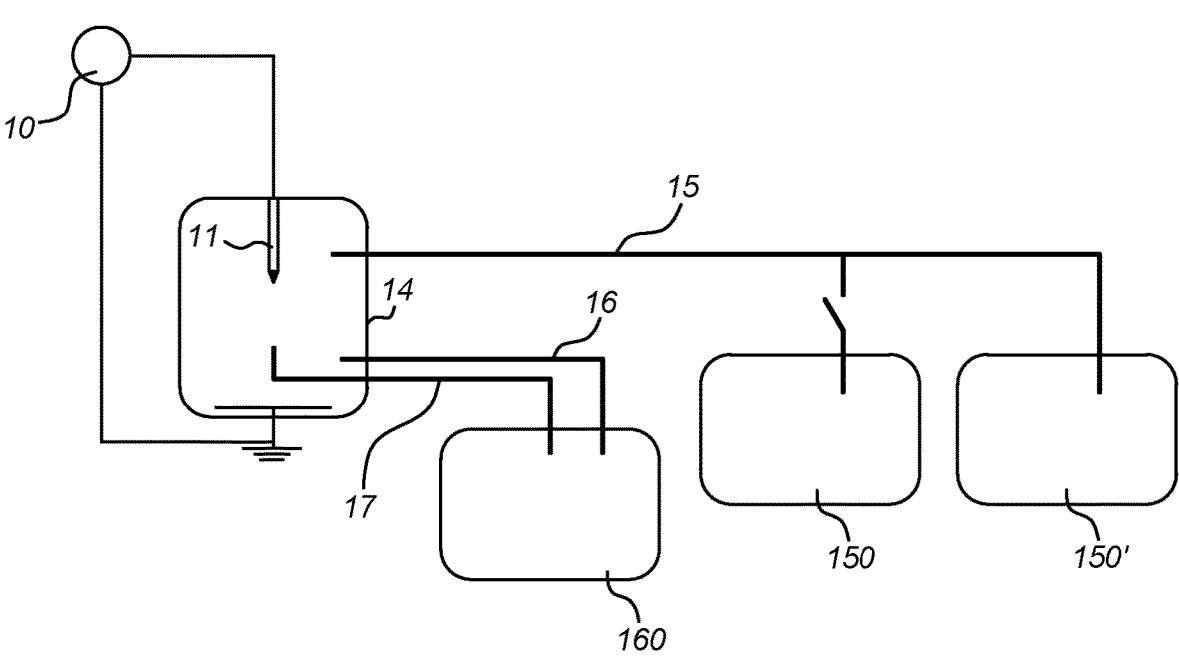

FIG. 1e shows the configuration of FIG. 1a again, now including details of possible fluid connections. In this example, conduit 15 can be used to transport gas between reservoirs 150 and 150', depending on the setting of valves in conduit 15. Conduit 16 can be used to bring liquid from reservoir 160 to the reaction chamber 14 and conduit 17 can be used to bring liquid from the reaction chamber 14 back to the reservoir 160. It will be clear to the skilled person that the inlets, outlets, conduits and reservoirs shown here are just exemplary, and that a skilled person can set up any inlets, outlets, conduits and reservoirs as required by any plasma activated fluid processing of interest.

Figure 2:
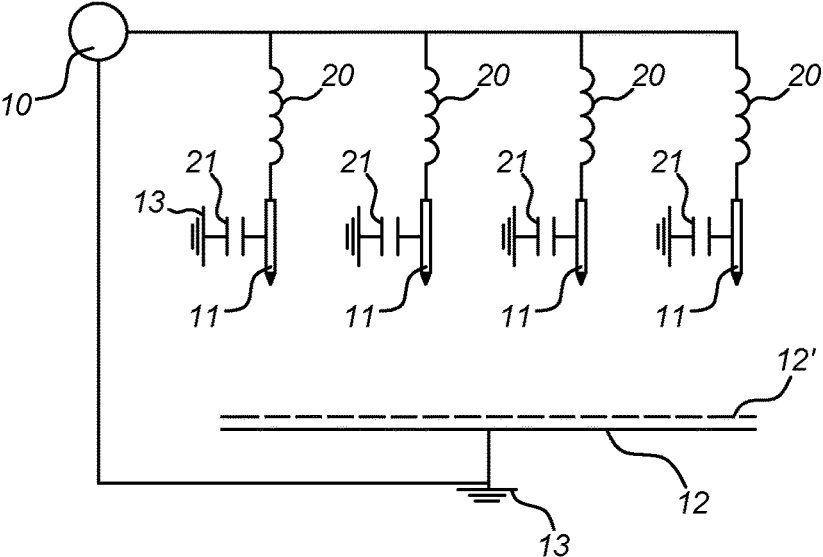
FIG. 2 schematically shows an electrical circuit for a plasma activated fluid processing system according to an embodiment of the invention.

FIG. 2 schematically shows an electrical circuit for a plasma activated fluid processing system according to an embodiment of the invention. The electrical components shown can be seen as forming the plasma generation part of the fluid processing system. The example of FIG. 2 follows the variant of FIG. 1c with four electrodes 11, but it will be understood that the example of FIG. 2 can be applied to any variant shown in FIGS. 1a-1e and the general variant with one or more reaction chambers 14 with one or more reaction electrodes 11 each.

Each electrode 11 is provided with an inductor 20, in series with the power source 10, and a capacitor 21 connecting the electrode 11 to ground 13. The capacitor 21 can be an additional capacitor and/or the intrinsic capacitance of the electrode 11 itself and/or of the inductor 20. Ignoring the impedance of any plasma for the moment, for each electrode 11, the inductor 20 and capacitor 21 will form an LC circuit with a resonance angular frequency given by the reciprocal of the square root of the product of inductance L and capacitance C:

$$\omega_{res} = \sqrt{\frac{1}{LC}} \qquad (1)$$

In an embodiment, all LC circuits (one for each of the m electrodes) have the same resonance frequency in the absence of a plasma.

In operation, the AC power source will activate the LC circuits, providing each LC circuits with its own voltage oscillations. When a plasma ignites at one of the reaction electrodes 11, the inductor 20 connected to that electrode will dampen the current through the plasma (which otherwise would spike because of the greatly reduced impedance of the plasma compared to the impedance of the un-ignited gas or liquid before ignition). This prevents an excessive load on the power source 10 due to the reduced impedance in one of the circuits. This allows the other circuits to ignite as well, overcoming the start-up problems described above. When all plasmas are ignited, the currents will be divided by the inductors 20, which have a higher impedance than the plasmas. As a result, each electrode 11 will get a proportional share of the power from the power source 10.

The reality is more complicated than the above ideal picture. As was mentioned, initially all circuits can be designed to have the same resonance frequency, e.g. in a symmetric system wherein stray capacitances are symmetric and equal. However, when one or multiple electrodes are ignited the resonance frequency shifts. That is, the plasma load impedance of an individual LC circuit can shift the resonance frequency of the complete circuit. An equation that takes the impedance R of the plasma (or un-ignited gas) between a single pair of reaction and ground electrodes into account is provided below:

$$\omega_{res} = \sqrt{\frac{1}{LC} - \frac{1}{(RC)^2}} \qquad (2)$$

Actually, multiple resonance frequencies and phase shifts can occur when not all plasma loads on the individual electrodes are equal.

It was expected that the impedance change due to igniting plasmas would lead to such shifts in the resonance frequency that the power supply would no longer supply power at or near the resonance frequency. Surprisingly, the applicant has found that the shifts in resonance frequency are relatively modest and can sometimes even be ignored. It is possible that he inductor acts as a balance impedance (each electrode will have a dominant impedance in series which effectively divides the source current over the electrodes). It is also possible that that there is a strong (self-regulating) interaction between the load impedance of the plasma and impedance of the LC circuit. A lower plasma load impedance could shift the resonance frequency which automatically reduces the power delivery to the plasma (at a fixed source frequency).

As an optional feature, for cases where the shifts in resonance frequency due to igniting plasmas cannot be ignored, it is advantageous to add a power supply frequency control circuit (not shown in FIG. 2) which is configured to change the frequency of the power supply to track the shifting resonance frequency. In other words, after the first plasma ignites, the source frequency can be adjusted to the shifted resonance frequency to maximize the voltage gain on the electrodes that are not yet ignited. The second electrode will ignite, and the process will repeat until the remaining electrodes are ignited. The resonance frequency of the system can thus be adjusted by shifting the source frequency to an optimal value where voltage gain in the system is maximized. The measurement of the system voltage gain can be realized by several methods, e.g. voltage probes on individual electrodes or a single (capacitive) voltage sensor which is placed in the centre of or encircled around the concentric coil structure.

As a further optional feature, after ignition of all the electrodes the source frequency can be adjusted continuously to control the output power to the plasma.

In an embodiment, the power source 10 is provided with an optional controller (not shown in FIG. 2) which can programmatically control the voltage and/or frequency and/or waveform shape of the power source output. By programmatically changing these settings periodically (e.g. at 0.1 ms or 1 ms periods) the plasmas can be made to switch between various modes, e.g. between thermal and nonthermal modes. This will in turn affect the reactions that take place in the plasmas. The inventors have found that it is possible to adjust the production ratios of certain compounds found in the processed fluids.

In an embodiment, an optional matching circuit (not shown in FIG. 2) is provided between the AC source and the parallel LC circuits. The matching circuit is configured to match the impedance of the source to the impedance of the parallel connected LC circuits for optimal power transfer.

Figure 3A:
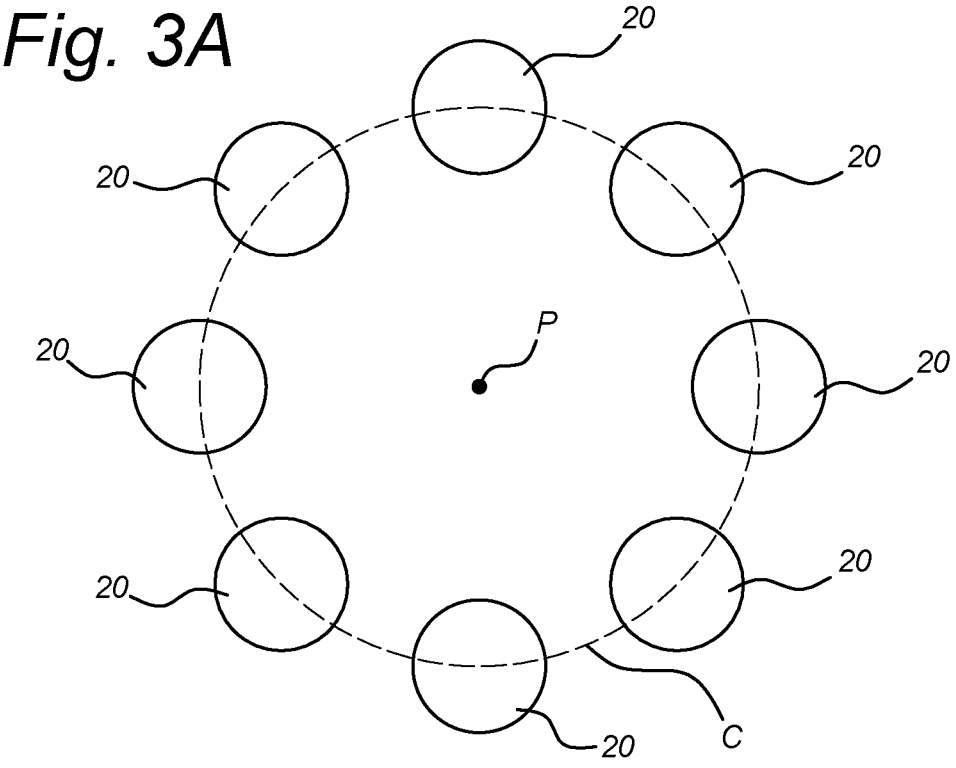
FIG. 3a-b schematically shows configurations of inductors according to an embodiment of the invention.
Figure 3B:
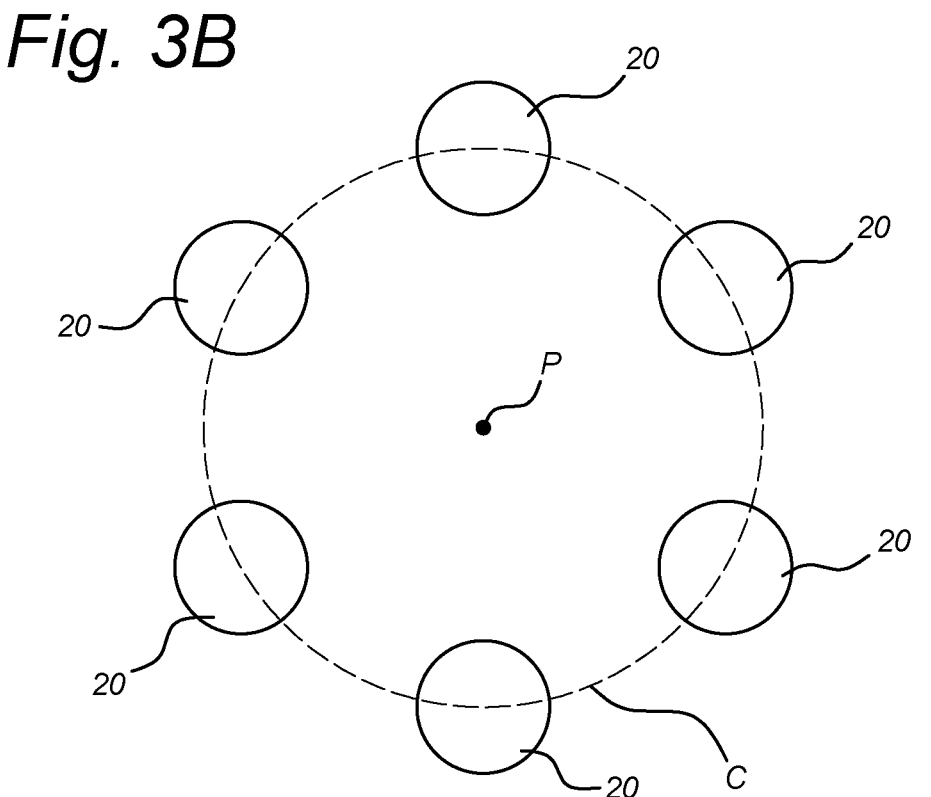

FIG. 3*a-b* schematically shows configurations of inductors 20 according to an embodiment of the invention. In FIG. 3*a*, eight inductors 20 are arranged in point-symmetrical fashion along circle C around point P. In FIG. 3*b*, six inductors 20 are arranged in point-symmetrical fashion along circle C around point P. In general, any number of inductors 20 can be arranged in point-symmetrical fashion around a central point. Other types of symmetries can be used as well. The same point symmetrical configuration could also be applied for the electrodes in the reactor to create more symmetric stray capacitances.

It has been found that such a configuration of inductors 20 promotes that every inductor 20 has the same capacitive coupling with the environment and the other inductors. As was mentioned, it is important that the total capacitance in each LC circuit (of which the inductor's capacitive coupling is a factor) is the same, so that each of the resonance frequencies are the same. Using this arrangement of inductors 20, the inventors found that it is no longer necessary to place grounded screens between the inductors, which is an inconvenient measure in high-voltage applications.

It is understood that if groups of inductors are at sufficient distances from each other, it is enough to organize the symmetrical arrangement within the group only. For example, in a configuration with two reaction chambers 14 with six electrodes each, totalling twelve inductors, wherein the two groups of six connected inductors are at a distance from each other, it is sufficient to setup each group of six inductors as shown in FIG. 3*b*.

In the foregoing description of the figures, the invention has been described with reference to specific embodiments thereof. It will, however, be evident that various modifications and changes may be made thereto without departing from the scope of the invention as summarized in the attached claims.

In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

In particular, combinations of specific features of various aspects of the invention may be made. An aspect of the invention may be further advantageously enhanced by adding a feature that was described in relation to another aspect of the invention.

It is to be understood that the invention is limited by the annexed claims and its technical equivalents only. In this document and in its claims, the verb "to comprise" and its conjugations are used in their non-limiting sense to mean that items following the word are included, without excluding items not specifically mentioned. In addition, reference to an element by the indefinite article "a" or "an" does not exclude the possibility that more than one of the element is present, unless the context clearly requires that there be one and only one of the elements. The indefinite article "a" or "an" thus usually means "at least one".

LIST OF REFERENCE NUMBERS

10: power source
11: Reaction electrode (high-voltage electrode)
12: Ground electrode
12': Dielectric barrier/water interface
13: Ground
14: Reaction chamber
15: Gas inlet/outlet
16: Fluid inlet
17: Fluid outlet
20: Inductor
21 Capacitor/intrinsic capacitance
150, 150': Reservoir
160: Reservoir

The invention claimed is:

1. A plasma activated fluid processing system, comprising:
   an alternating current, AC, source operating between 10 KHz and 50 MHz; and
   one or more reaction chambers, wherein each reaction chamber of the one or more reaction chambers comprises a plurality of reaction electrodes and at least one corresponding ground electrode, wherein each reaction electrode and the at least one corresponding ground electrode are separated by a gap,
   wherein the AC source is electrically connected on one side to the at least one corresponding ground electrode in parallel and on another side to each reaction electrode of the plurality of reaction electrodes in parallel,
   wherein each of reaction electrode of the plurality of reaction electrodes includes a capacitor connected to ground,
   wherein an inductor is provided between each of the reaction electrodes and the AC source, and
   wherein a frequency of the AC source is near a resonance frequency of an inductor-capacitor circuit formed by the inductor and the respective capacitor for each reaction electrode of the plurality of reaction electrodes.

2. The plasma activated fluid processing system according to claim 1, wherein the inductors provided between each of the reaction electrodes and the AC source are arranged a symmetrical fashion around a central point.

3. The plasma activated fluid processing system according to claim 1, wherein a voltage gain of the fluid processing system is configured to be determined, and wherein the frequency of the AC source is adjusted to maximize the voltage gain.

4. The plasma activated fluid processing system according to claim 1, wherein the capacitor is formed by an intrinsic capacitance of the system.

5. The plasma activated fluid processing system according to claim 4, wherein the intrinsic capacitance includes a stray capacitance of the reaction electrode and stray capacitance of the inductor.

6. The plasma activated fluid processing system according to claim 1, wherein the AC source is configured to control a voltage and/or a frequency and/or a waveform shape of the AC source output.

7. The plasma activated fluid processing system according to claim 1, wherein the at least one corresponding ground electrode is provided with a water interface, wherein the water interface forms the dielectric barrier.

8. The plasma activated fluid processing system according to claim 1, further comprising a gas inlet and/or outlet, a fluid inlet, and a fluid outlet.

9. The plasma activated fluid processing system according to claim 8, wherein the fluid inlet and the fluid outlet are connected to a water reservoir for plasma activated water.

* * * * *